(12) United States Patent
Hottinen et al.

(10) Patent No.: US 6,449,266 B1
(45) Date of Patent: Sep. 10, 2002

(54) DATA TRANSMISSION METHOD, TRANSMITTER, AND RECEIVER

(75) Inventors: Ari Hottinen, Vantaa; Timo Laakso, Espoo; Tero Ojanperä, Oulu, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 08/875,670

(22) PCT Filed: Jan. 31, 1996

(86) PCT No.: PCT/FI96/00061

§ 371 (c)(1),
(2), (4) Date: Feb. 10, 2000

(87) PCT Pub. No.: WO96/24206

PCT Pub. Date: Aug. 8, 1996

(30) Foreign Application Priority Data

Feb. 2, 1995 (FI) .................................................. 950463

(51) Int. Cl.$^7$ ............................ H04B 7/216; H04K 1/00
(52) U.S. Cl. ........................ 370/342; 370/441; 375/142; 375/143
(58) Field of Search ................................. 370/465, 468, 370/441, 335, 342, 320, 350, 208, 203, 341, 290, 291; 375/200, 262, 205, 206, 208, 209, 211, 150, 144, 148, 147, 142, 143, 152

(56) References Cited

U.S. PATENT DOCUMENTS 4,984,247 A    1/1991  Kaufmann et al. ............. 375/1
5,166,951 A *  11/1992 Schilling .................... 375/145

(List continued on next page.)

FOREIGN PATENT DOCUMENTS

| EP | 0 486 834 | 5/1992 |
| EP | 0 570 273 | 11/1993 |
| EP | 0 661 831 | 7/1995 |
| GB | 2 282 300 | 3/1995 |
| WO | WO 94/30025 | 12/1994 |

OTHER PUBLICATIONS

Boztas A., Kumar P.V.: Near Optimal 4ø Sequences for CDMA, Proc. ISIT 1991, Hungary p. 282, Jun. 1991.
G.R. Cooper, C.D. McGillem: Modern Communications And Spread Spectrum, McGraw–Hill, Singapore, 1986, Chapters 8–9.

(List continued on next page.)

*Primary Examiner*—Ajit Patel
*Assistant Examiner*—Hanh Nguyen
(74) *Attorney, Agent, or Firm*—Perman & Green, LLP

(57) ABSTRACT

The invention relates to a data transmission method, a transmitter and a receiver in a system which utilizes the CDMA method, in which several users communicate simultaneously on the same frequency band, and in which each user has its own spreading code, and in which the information channel capacity of at least one user differs from the capacity of the other users, the receiver comprising converter means for converting a received transmission into a digital form, and a number of means for synchronizing and for calculating the characteristic required for a decision from the transmission of each received user. In order to advantageously receive transmissions with multiple data rates or capacities in a receiver according to the invention, said number of means each comprise a group of correlators which may synchronized with waveforms of different types, and the receiver comprises means for processing said characteristics calculated for different types of waveforms by eliminating the effect of their mutual correlations.

25 Claims, 5 Drawing Sheets

U.S. PATENT DOCUMENTS

Figure 1A:
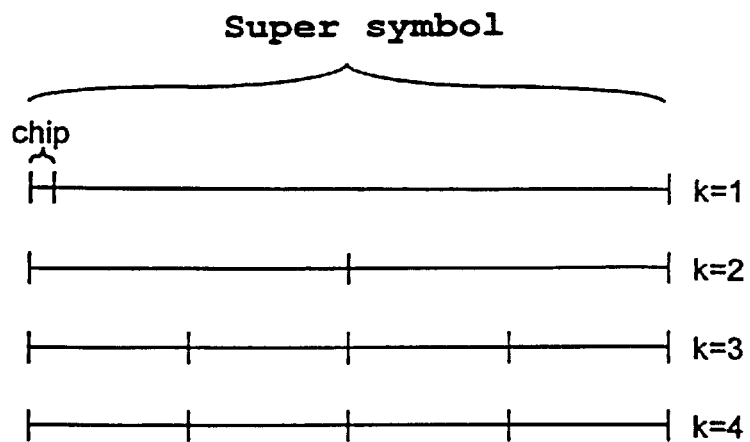

| | | | |
|---|---|---|---|
| 5,253,268 A | | 10/1993 | Omura et al. .................... 375/1 |
| 5,260,967 A | | 11/1993 | Schilling ........................ 375/1 |
| 5,442,625 A | * | 8/1995 | Gitlin et al. ................. 370/342 |
| 5,490,136 A | * | 2/1996 | Sereno et al. ............... 370/468 |
| 5,544,156 A | * | 8/1996 | Teder et al. ................. 370/342 |
| 5,586,113 A | * | 12/1996 | Adachi et al. ............... 370/342 |
| 5,592,469 A | * | 1/1997 | Szabo ........................ 370/342 |
| 5,627,845 A | * | 5/1997 | Asano et al. ................ 370/468 |
| 5,652,765 A | * | 7/1997 | Adachi et al. ............... 375/211 |
| 5,684,832 A | * | 11/1997 | Adachi et al. ............... 375/262 |
| 5,751,761 A | * | 5/1998 | Gihouaen .................... 370/209 |
| 5,832,022 A | * | 11/1998 | Scott ........................... 375/200 |

OTHER PUBLICATIONS

S. Verdu: Optimum Multiuser Asymptotic Efficiency, IEEE Trans. Commun., vol. 34, Sep. 1986.

G. Cooper, C.D. McGillem: Modern Communications and Spread Spectrum, McGraw–Hill, N.Y. 1986, Chapter 12.

\* cited by examiner

DATA TRANSMISSION METHOD, TRANSMITTER, AND RECEIVER

The invention relates to a data transmission method in a system which utilizes the CDMA method, in which several users communicate simultaneously on the same frequency band, and in which each user has at least one broad-band information channel, and in which the information channel capacity of at least one user differs from the capacity of the other users.

CDMA (Code Division Multiple Access) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the users can be distinguished from one another in the receivers on the basis of the spreading code of each user.

A CDMA receiver comprises means, which can be implemented for example with correlators or matched filters, for synchronization with a desired signal, which is recognized on the basis of the spreading code. In the receiver, the data signal is restored to the original band by multiplying it again by the same spreading code as during the transmitting stage. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

A CDMA system according to the background art is disclosed in U.S. Pat. No. 5,166,951, which is incorporated herein by reference and which describes a high-capacity system wherein the spreading code sequences used in the information channels are mutually orthogonal.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of a signal. One way of realizing a CDMA receiver is to use for example a so-called rake receiver, which consists of one or more rake branches. Each branch is an independent receiver unit, the function of which is to compose and demodulate one received signal component. Each rake branch can be caused to synchronize with a signal component which has propagated along an individual path, and in a conventional CDMA receiver the signals of the receiver branches are combined advantageously, for example coherently, whereupon a signal of good quality is obtained. The signal components received by the receiver branches may be transmitted from one base station, or in the case of macrodiversity, from several base stations.

The present cellular systems are mainly designed for the transmission of conventional speech traffic. This is also true for the latest digital systems, such as the European GSM system. There have been efforts to also enable the transmission of data services in digital systems, but so far the services and possibilities provided therein have been of inferior quality than in the fixed network.

An aim in developing cellular radio systems is to better take into account the needs of different data services. An essential factor in the transmission of services is that different services require transmission channels with considerably different capacity and quality requirements. The requirements set for both transmission rate and bit error ratio, for example, may vary depending on the type of service. For example, the transmission of video image over the radio path of the cellular system requires considerably more capacity than the transmission of speech.

An obvious manner of solving the problem of implementing connections requiring different amounts of capacity is to utilize the present speech channels flexibly so that connections requiring a high capacity are provided with several channels. In TDMA systems this often means several time slots, and in CDMA systems it means that a subscriber terminal simultaneously transmits and receives transmissions provided with several spreading codes. However, this is a very simple manner of implementing a system with multiple data rates or quality criteria, and it wastes capacity.

The purpose of the present invention is to provide a method of implementing multiple data rates or quality criteria in such a way that the quality of signals remains good and that the capacity of the system will be efficiently utilized. A further purpose of the present invention is to implement a transmitter that is capable of transmitting the signal of the user in an information channel having the desired capacity. Another purpose of the present invention is to implement a receiver that is capable of receiving signals with different types of waveforms and of eliminating the effect of interfering signals from desired transmissions.

This is achieved with the method of the type described in the preamble, characterized in that the parameters of each information channel depend on the desired capacity and transmission quality, and that each information channel is detected by taking into account the correlations between the channels.

The invention also relates to a receiver in a system which utilizes the CDMA method, in which several users communicate simultaneously on the same frequency band, and in which each user has its own spreading code, and in which the information channel capacity of at least one user differs from the capacity of the other users, the receiver comprising converter means for converting a received transmission into a digital form, and a number of means for synchronizing and for calculating the characteristic required for a decision from the transmission of each received user. The receiver according to the invention is characterized in that said number of means each comprise a group of correlators which may be synchronized with waveforms of different types, and that the receiver comprises means for processing said characteristics calculated for the different types of waveforms by eliminating the effect of their mutual correlations.

The invention also relates to a transmitter in a system which utilizes the CDMA method and in which several users communicate simultaneously on the same frequency channel, the transmitter comprising means for forming the symbols to be transmitted. The transmitter according to the invention is characterized in that the transmitter comprises means regulating the length of the symbols to be transmitted, means for converting a desired number of symbols to be transmitted into a parallel form, means for generating spreading code sequences the number of which equals the number of the symbols to be transmitted in parallel, and means for multiplying each of the symbols to be transmitted by its own sequence.

In the method according to the invention, different data transmission needs can be implemented together with a high transmission quality. Each system user may have different parameters of the transmission connection, i.e. the type of the waveform in the information channel used, according to the requirements set for the connection. In this connection, connection parameters refer to for example the chip rate or length of the spreading code and to the data symbol length.

In a preferred embodiment of the invention, different users have data symbols of different length. The data symbol lengths of different users are selected in such a way that the symbol lengths used are fractions of the length of a specific given super symbol. The spreading code sequences that modulate the data symbols of the users recur at intervals of the given super symbol. During detection the interference between the users can be decreased by taking into account the mutual correlations between the received signals. Detection can be implemented advantageously in such a way that a desired number of signals are received and correlation terms over the super symbol to be detected are calculated, and these correlation terms are utilized in the detection in such a way that the mutual interference between the signals to be transmitted with different data symbol rates can be eliminated.

In a second embodiment of the invention, which can be used as a part of the above-described embodiment, a user transmits some of his data symbols in a parallel form so that each parallel symbol is multiplied by a spreading code sequence that is formed of parts of a longer spreading code. This spreading code is used over connections requiring a lower capacity to multiply one symbol. In a third embodiment of the invention, the spreading codes by which the parallel data symbols are multiplied are substantially mutually nonorthogonal. In the receiver the signals naturally interfere with one another, but the interference can be eliminated during the detection by means of a suitable interference cancellation algorithm.

Figure 1B:
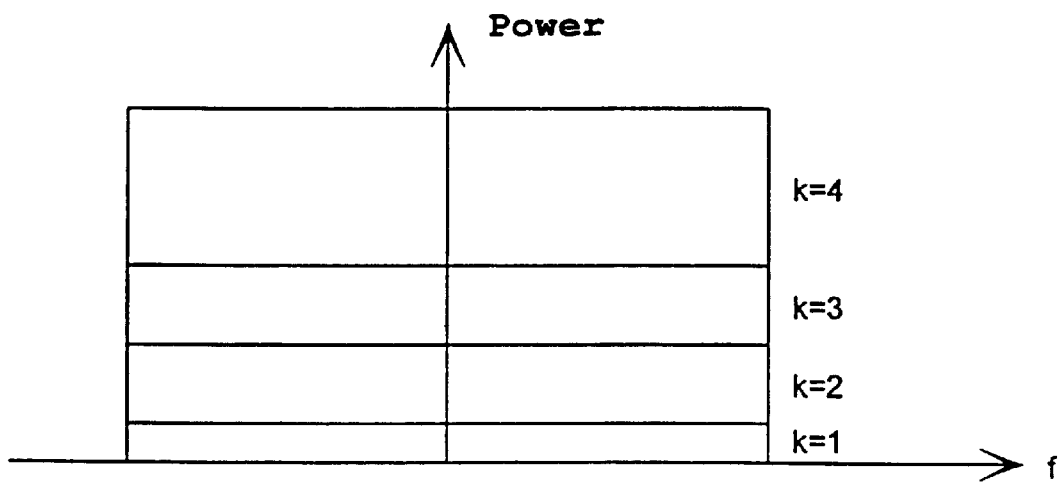
Figure 2A:
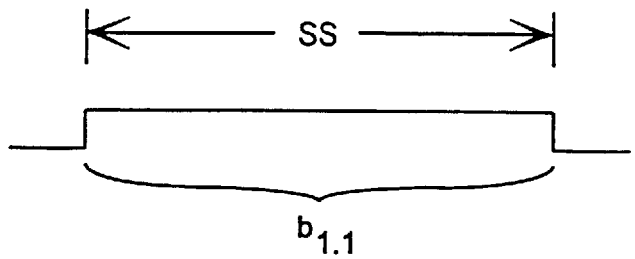
Figure 2B:
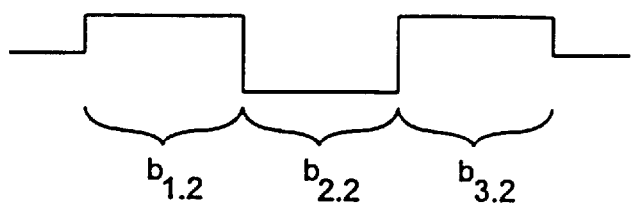
Figure 2C:
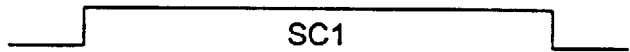
Figure 2D:
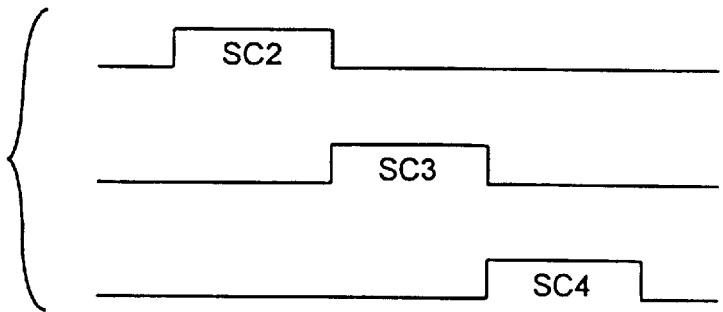
Figure 4C:
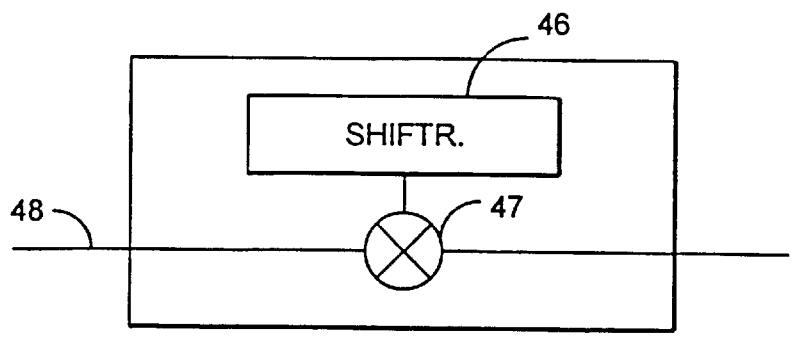
Figure 3:
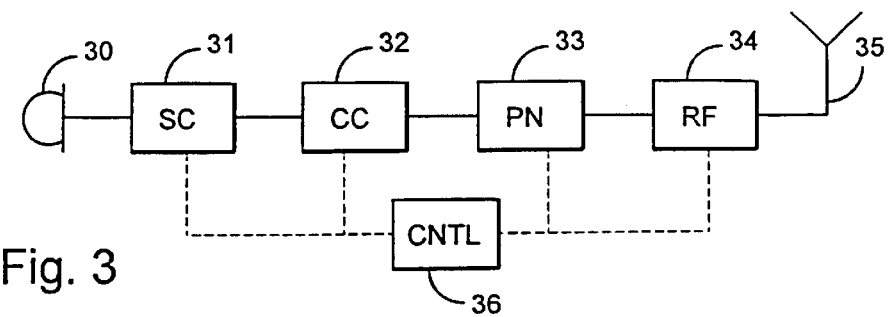
Figure 4A:
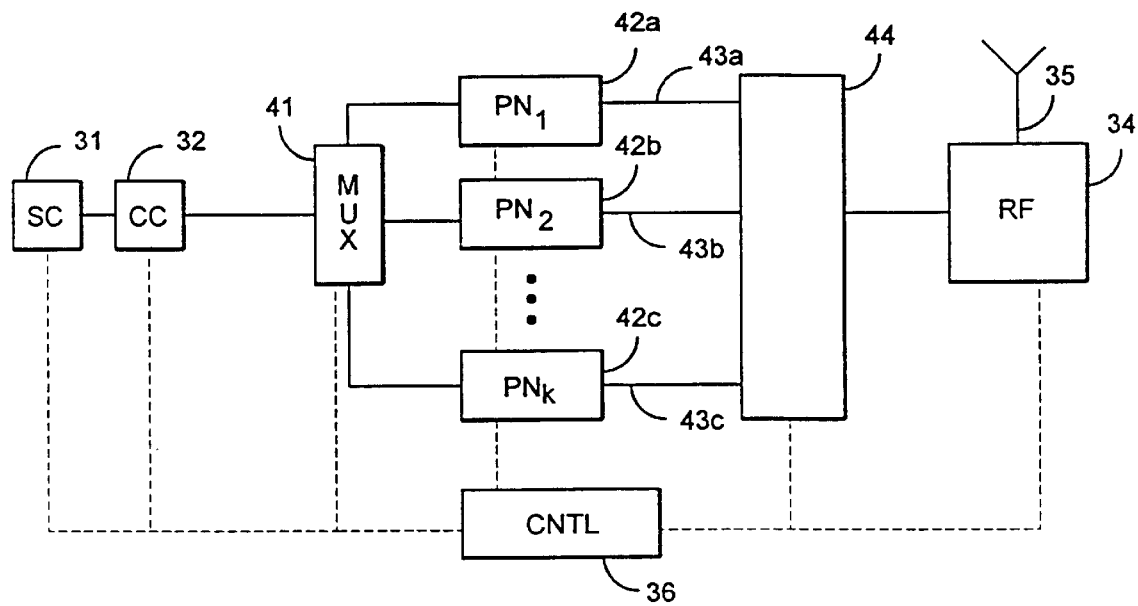
Figure 4B:
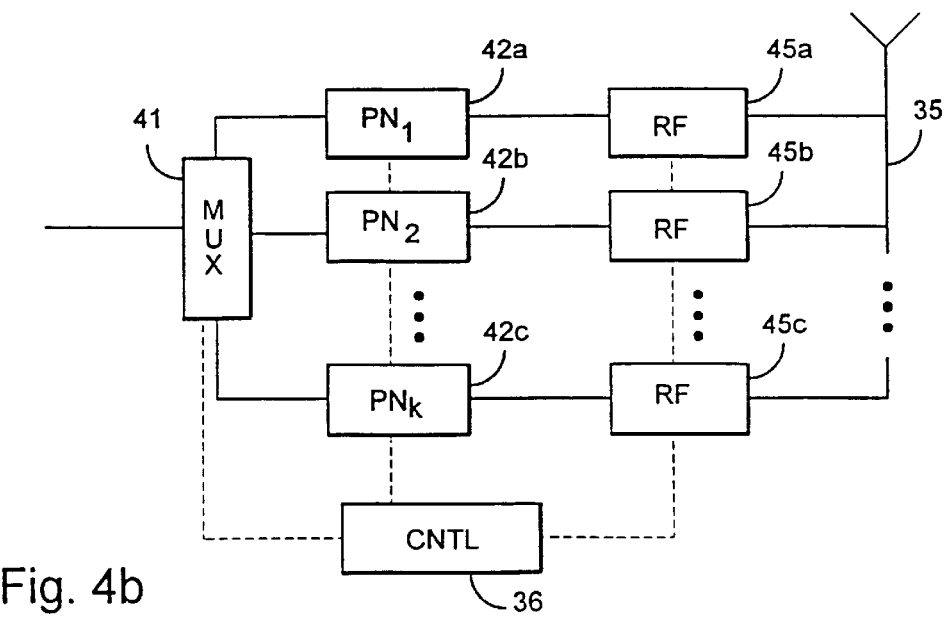
Figure 5:
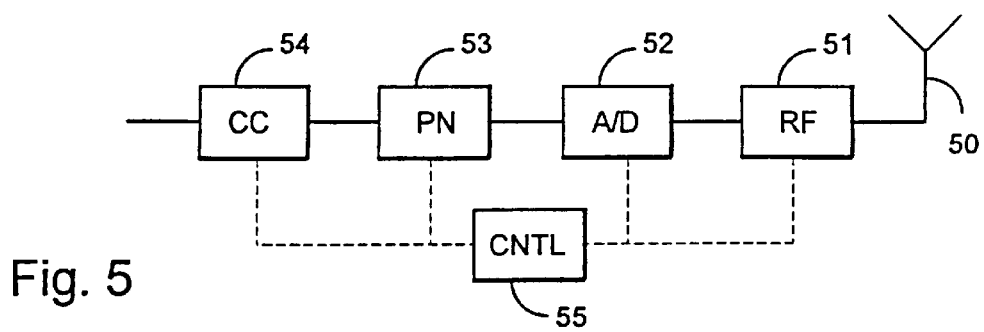
Figure 6:
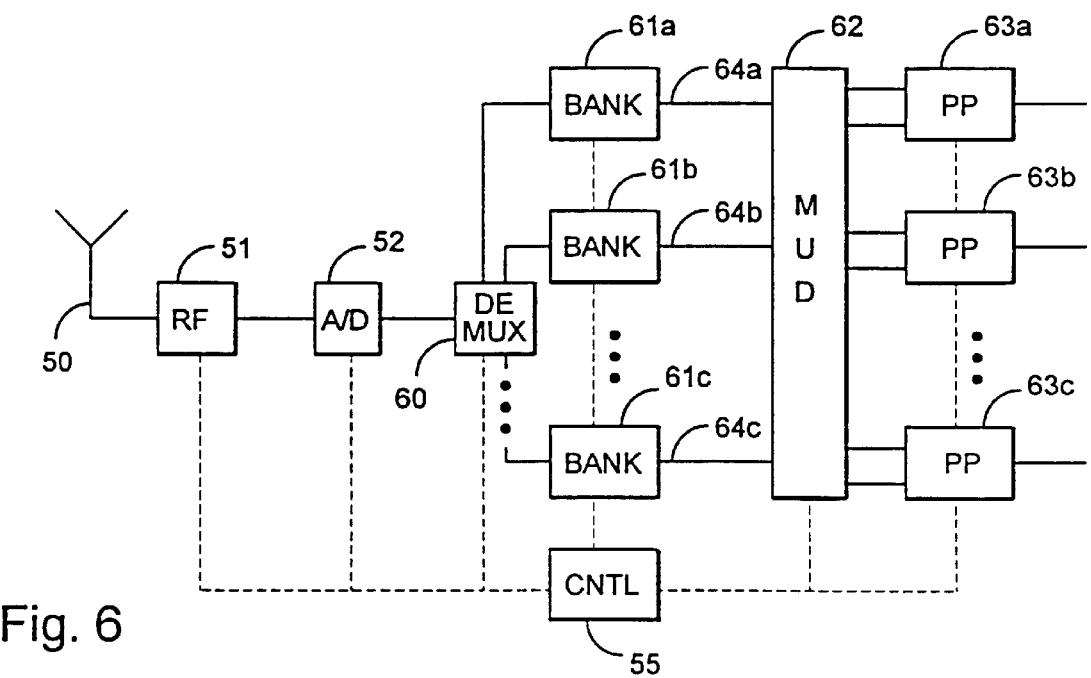
Figure 7:
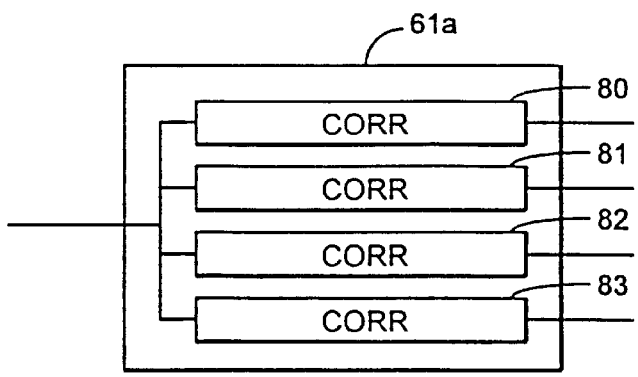
Figure 8:
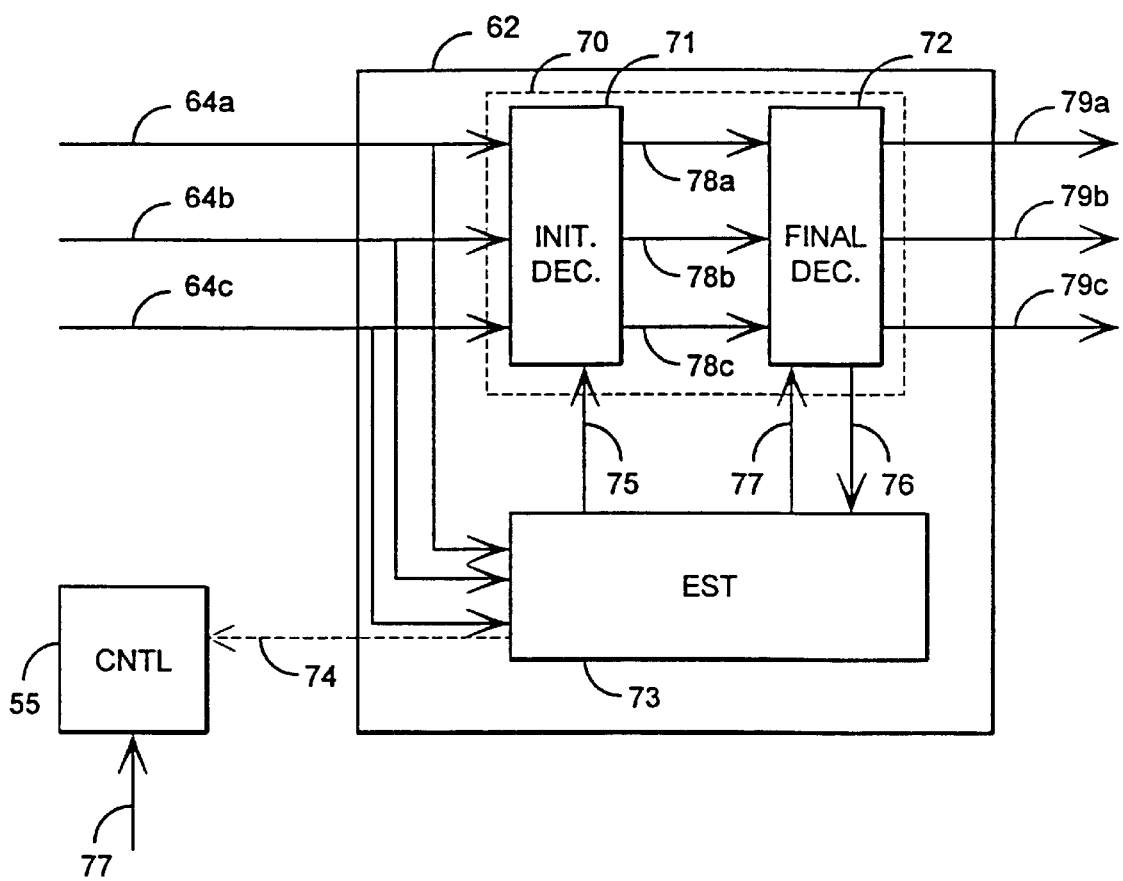

In the following, the invention will be described in greater detail with reference to the examples according to the accompanying drawings, in which FIG. 1a illustrates the transmission with different data rates and the use of a super symbol, FIG. 1b illustrates the power distribution between users transmitting at different data rates, FIGS. 2a to 2d illustrate the use according to the invention of different spreading code alternatives, FIG. 3 is a block diagram of a possible implementation of a transmitter according to the invention, FIGS. 4a and 4b are more detailed block diagrams of alternative implementations of a transmitter according to the invention, FIG. 5 is a block diagram illustrating a possible implementation of a receiver according to the invention, FIG. 6 is a more detailed block diagram illustrating a possible implementation of a receiver according to the invention, FIG. 7 is a block diagram illustrating a group of matched filters, and FIG. 8 is a block diagram illustrating a possible implementation of an interference cancellation block in a receiver according to the invention.

In the following, an asynchronous CDMA system wherein the method according to the invention can be applied is first described by way of example. Correspondingly, the invention is also applicable to a synchronous system, as it is evident for a person skilled in the art.

Assume that the asynchronous CDMA system comprises K users, each of which is assigned a spreading waveform $$s_k(t) = \sum_{j=1}^{N_k} s_k^{(j)} \Pi_{T_{c,k}}(t - jT_{c,k})$$

where the jth chip, i.e. bit, of the spreading waveform of the kth user is obtained with $$S_k^{(j)} \in \{-1,1\}, k=1, \ldots K.$$

Above, $T_{c,k}$ is the chip length of the kth user, $N_k$ is the number of chips in the spreading waveform of the kth user. No restrictions are set for the spreading code of the user. The user k may have a unique chip length $T_{c,k}$ (bandwidth), symbol length $T_{b,k}$, and a time-varying waveform, since $N_k T_{c,k} \geq T_{b,k}$. The users transmit information by modulating the spreading waveforms by data symbols $b_k^{(i)} \in A$, where A is the symbol alphabet. In the CDMA, all users transmit simultaneously on the same frequency. The function of the receiver is thus to demodulate the summed signal $$r(t) = \sum_{k=1}^{K} \sum_{j=-P}^{P} h_k(t) w_k^{(b_k)}(t - iT_b - \tau_k) + n(t), \quad (1)$$

where n(t) represents white Gaussian noise with variance $\sigma^2$, 2P+1 denotes the length of the data packet, $h_k(t)$ denotes the impulse response of the physical channel of the kth user, and $$w_k^{(b_i)} = \sum_{m=0}^{M-1} s_{k,m}(t) b_k^{(i \times M + m)} i_{[0,T_b]}(t)$$

is the modulated waveform of user k which has the symbol sequence $b_i=(b_k, \ldots, b_k^{(i \times M+m)})$ (subscript k is omitted from the symbol $b_i$, since it is implicitly expressed in the waveform $w_k$).

It is also assumed, without limiting the generality, that the multipath channel is of the form $$h_k(t) = \sum_{l=1}^{L} h_{k,l}(t)\delta(t - \tau_{k,l}(t))$$

where the lth channel tap of the kth user is denoted by $h_{k,l} \in C$. It is assumed that the delays $\tau_{k,l}$ are known or have been estimated beforehand and that they remain constant during the transmission. With these assumptions it is possible to omit the time index and to write $\tau_{k,l} \equiv \tau_{k,l}(t)$. In the following the complex taps $h_{k,l}(t)$ are either constant or fading as a function of time.

In the following, preferred embodiments of the method according to the invention for providing multiple data rata transmission in the CDMA system are described.

Assume first that each user k has the same chip rate of the spreading code, i.e. $T_{c,1} \equiv T_{c,2} \equiv \ldots T_{c,K}$. According to their need for capacity, different users may be provided with different symbol rates, which are fractions of a specific super symbol length. The spreading code sequence used recurs at intervals of the super symbol. The situation is illustrated in FIG. 1a, which shows four users, k=1, . . . , 4, and in which user k=1 has the lowest symbol rate that equals the super symbol rate. For the sake of clarity, the figure also shows the length of one spreading code bit, or chip, by way of example. In reality, the chip length can be smaller than FIG. 1a shows.

The data rate of user k=1 is denoted in the example of FIG. 1a with the letter R. User k=2 has a double symbol rate, i.e. 2R. Users k=3 and k=4 have a fourfold symbol rate 4R compared with the super symbol rate. A possible power distribution between these users is shown in FIG. 1b. User k=4 utilizing the highest symbol rate also has the greatest proportion of the power. Examine in the following two possible ways of implementing multiple data rate transmission, both of these manners being applicable in the preferred embodiment of the invention.

Generally, the information channel of user k having an M-fold symbol rate compared with the basic rate can be implemented in the form of M parallel information channels. The situation is illustrated by the formula $$w_k(t) = \sum_{m=0}^{M-1} s_{k,m}(t),$$

where each $S_{k,m}(t)$ is time-limited to $[0, T_{b,k}[$. The spreading codes used in different channels can be selected for example from the hadamard code set, so that they are sufficiently orthogonal. In the method according to the invention wherein the detection of the received signal utilizes the mutual correlations of the received signals, codes that are mutually substantially nonorthogonal, i.e. that interfere with one another, can also be used in the different information channels of the same user. The interference of one user, generated on purpose, can be eliminated in the receiver by means of interference cancellation algorithms.

Secondly, user k can transmit information utilizing time-orthogonal waveforms, where $$s_{k,m}(t) = s_{k,m}(t) 1_{r_{k,m}},$$

where $$\left[0, T_{k,b}\right[ = \bigcup_{m=0}^{M-1} T_{k,b,m}, \bigcap_{m=0}^{M-1} T_{k,b,m} = \varnothing.$$

The data symbols of the user are thus modulated by M time-orthogonal codes, if it is assumed that user k has an M-fold symbol rate compared with the basic rate. The aforementioned M time-orthogonal subcodes are preferably of equal length.

The use of different spreading code alternatives according to the invention is illustrated in FIGS. 2a to 2d. Assume that there are two users k=1,2, of which user k=1 transmits at the basic rate of the system, i.e. the data symbol of the user has the same length as the super symbol. This is illustrated in FIG. 2a, which shows the data symbol $b_{1,1}$ of user k=1, this data symbol having the length of the super symbol SS and being modulated by a spreading code of the length of the super symbol. Assume that user k=2 transmits at a data rate which is threefold compared to user k=1, i.e. in this example M is 3. This is illustrated in FIG. 2b, which shows the data symbols $b_{1,2}, b_{2,2}$ and $b_{3,2}$ of user k=2, the symbols together having the length of the super symbol SS. FIG. 2c illustrates an example where the data symbols of user k=2 are multiplied during transmission by one spreading code SC1 having the length of the super symbol. FIG. 2d in turn illustrates an example where each of the data symbols $b_{1,2}, b_{2,2}$, and $b_{3,2}$, of user k=2 is multiplied during transmission by its own time-orthogonal spreading code sequence SC2, SC3 and SC4, respectively.

The spreading codes used may naturally also be complex spreading codes. The I and Q branch may have different spreading codes. When different spreading codes, spreading ratios and data rates are used over different connections, the frequency band utilized by each user may vary. One user may utilize, for example, a band of 5 MHz and another user a band of 2.5 MHz, the bands being located partially superimposed in the frequency domain on the frequency range reserved for the system. The use of the spreading codes is illustrated in Boztas S., Kumar P. V.: Near Optimal 4Φ sequences for CDMA (Proc. ISIT 1991, Budapest, Hungary, p. 282, June 1991).

FIG. 3 is a general block diagram illustrating the structure of a transmitter according to the invention. The figure shows a block diagram of a subscriber terminal, but the transmitter according to the invention can naturally also be realized in a similar manner in a base station transmitter. The transmitter comprises a microphone 30, a speech coder 31, means 32 for performing channel coding, means 33 for multiplying the signal to be transmitted by a spreading code, and radio-frequency means 34 which transfer the signal to be transmitted to the frequency domain used over the radio path, and an antenna 35. The transmitter also comprises a control unit 36, which controls the operation of the parts of the transmitter. The control unit 36 is typically realized by means of a microprocessor. The transmitter to be realized may naturally also comprise other components, such as filters, A/D converters, and a user interface, such as a keyboard and a display unit, as it is clear for a person skilled in the art, but since they are not essential to the present invention they will be not shown in the figure in order to keep it simple. Further, the transmitter may comprise some other data source instead of a microphone and a speech coder.

FIG. 4a is a block diagram illustrating in greater detail the structure of a transmitter according to a preferred embodiment of the invention. In the transmitter according to the invention, the control unit 36 regulates the symbol formation in the speech coder or data source 31 and in the coding means 32 in such a way that the symbols to be transmitted in the output signal 40 of the coding means 32 are of desired length. The transmitter further comprises means 41 for converting the signal to be transmitted into a parallel form. The converter means 41 can be implemented for example with a serial-to-parallel converter. The symbols converted into a parallel form are supplied to means 42a to 42c wherein a required number of spreading code sequences are generated, the number of the sequences equalling the number of the symbols to be transmitted in parallel, and each of the symbols to be transmitted being multiplied in the means by a different sequence. Depending on the data rate used, the number of the parallel symbols may vary in different calls according to control from the control means 36. With reference to FIGS. 2a to 2d and to the corresponding description, if the data rate of user k=1 equals the basic rate, only one pair of spreading coding means 42a are used, i.e. there is no need for parallel transmission. If user k=2 transmits at a data rate that is threefold compared to the data rate of user k=1, three parallel symbols are transmitted, and they are multiplied in parallel by the spreading code sequences SC2, SC3 and SC4, respectively, according to FIG. 2d.

The spreading codes used in the means 42a to 42c can be formed of successive parts of a longer code having the length of for example a super symbol. The spreading codes used in the means 42a to 42c can also be selected in such a way that some of the codes are substantially mutually nonorthogonal. Each of the means 42a to 42c thus comprises, according to FIG. 4c, means 46 for generating a spreading code sequence and means 47 for multiplying the symbols 48 to be transmitted with these sequences. The means 46, 47 can be implemented utilizing known components, such as shift registers and multipliers. The generation of the spreading codes is described in greater detail in G. R. Cooper, C. D. McGillem: *Modern Communications And Spread Spectrum* (McGraw-Hill, Singapore, 1986; chapters 8 and 9), that is incorporated herein by reference.

The transmitter further comprises means 44 in which parallel symbols are combined for transmission and which can be implemented for example by means of an adder. The transmitter also comprises means 34 for amplifying and transferring the signal to be transmitted to the frequency used over the radio path.

The transmitter can also be realized in the manner illustrated in FIG. 4b, wherein radio-frequency means 45a to 45c are connected in cascade with each means 42a to 42c, the signal being transferred to the radio frequency, amplified in the radio-frequency means and supplied from there to an antenna 35.

In the following, the method according to the invention will be described with respect to reception. There are two alternatives for the optimality criterion used in detection: the maximum likelihood (ML) method or the maximum a posteriori (MAP) method, the former being utilized in the present description. Therefore, the log-likelihood function that can be derived from the conditional probability density function of the observed waveform is of the form $$\Lambda(B, \alpha) = \frac{2}{N_0} \int \mathbb{R}[r(t)c^*(t, B)]dt - \frac{1}{N_0} \int |c(t, B)|^2 dt, \quad (2)$$

where $$c(t, B) = \sum_{k=1}^{K} \sum_{i=-P}^{P} h_k(t) w_k^{(b_i)}(t - iT_b - \tau_k)$$

thus denotes the received signal. The derivation of the above formulas in the transmission with a single data rate is described in S. Verdu: Optimum multiuser efficiency (IEEE Trans. Commun., Vol 34, September 1986) that is incorporated herein by reference. Denote from now on $$\alpha_{k,1}(t) \equiv \sqrt{\frac{E_k}{T_b}} h_{k,1}(t).$$

The above-described formulas determine the general detection criterion without any assumptions concerning the receiver front-end, typically realized with a number of matched filters. When a despread signal is concerned, the formulas may be treated in the following manner.

It is first assumed without limiting the generality that the channel concerned is a high-capacity channel where information is transmitted utilizing parallel physical channels and where $M_i$ traffic channels can be reserved for the use of $K_i$ users. This can be interpreted as a system with $\tilde{K} = \Sigma K_i M_i$ users, where $K = \Sigma K_i$. Assume that the aforementioned $\tilde{K}$ information streams are collected in the matrix $B_{\tilde{K}} \times (2P+1)$ in such a way that each user with a different data rate adds $M_i$ rows to a designated location in the original matrix of the basic data rate by replacing the $b_k^{(i)}$s with $b_k^{(i)}$s. The log-likelihood function of the despread signal is described with the formula $$B_{opt} = \arg_{B \in \{1-,1\}} \max_{\{2P+1\} \times K} (B|\alpha, R, \tau)$$

where $\alpha = (\alpha_{1,1}, \ldots, \alpha_{1,L}, \ldots, \alpha_{K,L})^T$ denotes the received signal amplitudes of the K users, $\tau = (\tau_{1,1}, \ldots, \tau_{1,L}, \ldots, \tau_{K,L})^T$ denotes the corresponding delays of the signal components, and $R = (R_{-P}, \ldots, R_P) \in C^{(k \times L \times N) \times (2P+1)}$ is the matrix of the normalized cross-correlations of the transmitted $\tilde{K} \times (2P+1)$ symbols, the pth submatrix being $R_p$. This corresponds to the effect of cross-correlation observed in the detection of the Pth symbol interval, and it is determined in the formula $$R_p = [\tilde{R}^{(p-N)}, \ldots, \tilde{R}^{(p+N)}]^T,$$

where $$\tilde{R}^{(i)} = \begin{bmatrix} R_{1,1}^{(i)} & \cdots & R_{1,\tilde{K}}^{(i)} \\ \vdots & \ddots & \vdots \\ R_{\tilde{K},1}^{(i)} & \cdots & R_{\tilde{K},\tilde{K}}^{(i)} \end{bmatrix}$$

where the correlation between the lth multipath-propagated signal component of the kth user and the l'th multipath-propagated signal component of the k'th user is obtained from the formula $$[\tilde{R}_{k,k'}^{(i)}]_{l,l'} = \int_{-\infty}^{\infty} c_{k,m}(t - \tau_{k,l}) c_{k',m'}(t - \tau_{k',l'} + iT_b) dt.$$

It is thus seen that the cross-correlation matrix of the received symbols is a function of the vector $\tau$. The cross-correlation matrix can be estimated from the received signal by estimating the delays $\tau_i$, the data rates $M_i$ and the codes $f_k$. Naturally some of these can also be considered known. Taking into account that the system is an asynchronous CDMA system according to formula (1), the log-likelihood function described in formula (2) can now be written as $$\Lambda(B|R, \alpha) = \sum_{i=-P}^{P} \frac{1}{N_0} \left( 2\mathbb{R}[\hat{\alpha}^H \hat{B}^{(i)} z^{(i)}] - \sum_{i'=-P}^{P} \alpha^T \hat{B}^{(i)} \hat{R}^{(i'-i)} \hat{B}^{(i'-i)} \alpha^* \right), \quad (3)$$

where $$\hat{B}^{(i)} = \begin{bmatrix} b_1^{(i)} I & \cdots & 0 \\ \vdots & \ddots & \vdots \\ 0 & \cdots & b_{\tilde{K}}^{(i)} I \end{bmatrix}.$$

The latter sum term in the above formula (3) of the log-likelihood function represents the effect of the neighbouring bits, and in a synchronous system this term is zero. Correspondingly, taking into account that the system comprises several data rates, the above symbol matrix $\hat{B}^{(i)}$ can be written as $$\hat{B}^{(i)} = \begin{bmatrix} b_1^{(i)}I & \cdots & 0 \\ \vdots & \ddots & \vdots \\ 0 & \cdots & b_K^{(i)}I \end{bmatrix},$$

where the dimension of the identity matrix related to the kth user is $(M_k \times L) \times (M_k \times L)$. Therefore, the sufficient characteristic of the received signal required in the detection can be represented by the formula $$z^{(i)} = (z_{1,1}^{(i)}, z_{1,2}^{(i)}, \ldots, z_{K,L}^{(i)})^T$$

where the vector $z_{k,l}^{(i)} = (z_{k,l,1}^{(i)}, \ldots, z_{k,l,M_K}^{(i)})$. Each term $z_{k,l,m}^{(i)}$ represents a despread signal that is related to the mth information waveform of user k and that has the form $$z_{k,l,m}^{(i)} = \int_{-\infty}^{\infty} r(t)c_{k,m}(t - \tau_{k,l} - iT_b)dt$$

where $T_b$ denotes the length of the symbol interval.

Assume that BPSK symbols are transmitted, and that the transmitted signal propagates in a fading multipath channel. The multirate detector thus estimates the ith bit of the Kth data stream for example according to the following formula $$\hat{b}_{\tilde{k}}^{(i)}(m+1) = \mathrm{sgn}\{\Re[\tilde{\alpha}^H D_{\tilde{k}} z^{(i)} - I(i,k,m)]\},$$

where $$I(i, \tilde{k}, m) = \tilde{\alpha}^H D_{\tilde{k}} \left( \sum_{i'=i-N}^{i+N} \hat{R}^{(i'-i)} I_{\tilde{k}}^{(i'-i)} \tilde{B}^{(i'-i)}(m) \tilde{\alpha} \right)$$

represents the interference cancellation term. The matrix operator
$D_{\tilde{k}} = \mathrm{diag}(d_{1,1}, \ldots, d_{1,L}, d_{2,1}, \ldots, d_{K,L})$
thus picks out the $\tilde{k}$th data stream, i.e. a transmission received by the rake branches receiving the desired signal, and it has the values $d_{\tilde{k},1} = \ldots = d_{\tilde{k},L} = 1$ on the $\tilde{k}$th submatrix, and 0 elsewhere. The matrix $I_k$ comprises the transmission received by the rake branches that are synchronized with the signal of the kth user, and that are thus interference to the desired signal. The matrix $I_{\tilde{k}}^{(i)} = I, \forall i \neq 0$, and $I_{\tilde{k}}^{(0)} = I - D_{\tilde{k}} \cdot \hat{R}$ is thus a correlation matrix, and the matrix $\tilde{B}$ comprises bit estimates. Usually a multipath-propagated signal is first processed with a rake receiver stage with L diversity arms, and the polarity of the signal is determined, after combining, with a hard limiter. This corresponds to a situation wherein the interference cancellation term is omitted, i.e. $I(i,k,m)=0$.

FIG. 5 is a general block diagram illustrating the structure of a receiver according to the invention. The figure is a block diagram of a base station receiver, but the receiver according to the invention can naturally also be realized similarly in a subscriber terminal.

The receiver comprises an antenna 50, and a radio-frequency unit 51 operationally connected thereto, converter means 52 operationally connected in cascade with the radio-frequency parts, means 53 for counting the characteristics required for a decision, the means being operationally connected to the output of the converter means, and channel decoding means 54 operationally connected to the output of the counting means. The receiver also comprises a control unit 55, which controls the operation of the aforementioned components. The receiver naturally also comprises other components, such as filters, but for the sake of clarity they are not described in the above-described example.

A transmission received by the antenna 50 is supplied to the radio-frequency parts 51 wherein the received signal is converted to the desired intermediate frequency. The resultant signal is further supplied to the converter means 52 wherein the signal is converted into a digital form with conventional methods. The digitized transmission is further supplied to the characteristic-counting means 53 wherein the signal is despread, i.e. it is restored to the original frequency band, and demodulation and detection are performed. The operation of the means 53 will be described in greater detail below. The detected signal can be further subjected to channel decoding with known methods in the means 54, and the resultant signal is further supplied to other parts of the receiver.

FIG. 6 is a block diagram illustrating in greater detail the structure of a receiver according to a preferred embodiment of the invention. As described above, the receiver comprises an antenna 50, radio-frequency parts 51 connected thereto, and converter means 52 operationally connected to the output of the radio-frequency parts. Demultiplexing means 60 are operationally connected in the receiver to the output of the converter means, the outputs of the demultiplexing means being supplied to a number of groups 61a to 61c of matched filters, each of these groups thus comprising one or several matched filters. The outputs of the matched filters are supplied to interference cancellation means 62 to the output of which a number of signal post-processing means 63a to 63c are operationally connected, the number of the latter means being preferably equal to the number of the aforementioned filter groups 61a to 61c. Control means 55 control the operation of the described parts of the receiver. The control means 55 are typically realized by means of a processor.

As above, a transmission received by the antenna 50 is supplied to the radio-frequency parts 51 wherein the received signal is converted to the desired intermediate frequency. The resultant signal is further supplied to the converter means 52 wherein the signal is converted into a digital form with conventional means. The digitized transmission is further supplied to the demultiplexing means wherein the received digitized transmission is distributed to the different filter groups 61a to 61c. Each group 61a to 61c comprises a number of matched filters which can synchronize with the received signal and disassemble a signal component transmitted with the desired spreading code. Each group may comprise a different number of matched filters, and each group may simultaneously have a different number of filters active. The number of entire simultaneously active filter groups thus equals the number $\tilde{K}$ of the active users. Each filter group 61a to 61c preferably receives a signal transmitted by one user. As described above in connection with the method according to the invention, the signal of one user can be transmitted by utilizing several parallel spreading codes, which may be substantially mutually nonorthogonal or mutually time-orthogonal, depending on the data rate of each user. Different filters of a filter group may thus be synchronized with signals transmitted with different spreading codes, but the signals, however, come from the same user. The control means 55 provide each filter group 61a to 61c with data concerning the spreading codes with which the matched filters should synchronize themselves.

The output signals 64a to 64c of the matched filter groups 61a to 61c comprise the previously described vectors $\{z_1^{(i)}, \ldots, z_{\tilde{K}}^{(i)}\}$, which are thus the despread signals of each user. These signals 64a to 64c are supplied further to the interference cancellation means 62 wherein the signal detection is performed by taking into account the correlations between the signals of different users and the signals of the same user transmitted with different codes. The operation of the interference cancellation means 62 will be described in greater detail below. The signal obtained from the interference cancellation means is further supplied to the signal post-processing means 63a to 63c which may comprise for example deinterleaving means, channel decoding, multiplexing means, some other receiver stage or means for combining the signal of one user, consisting of several parallel transmissions.

FIG. 7 is a block diagram illustrating a group 61a of matched filters. The group thus comprises a number of matched filters 80 to 83 which may be realized for example by means of correlators. The implementation of a correlator is described in greater detail in G. Cooper, C. McGillem: *Modern Communications And Spread Spectrum* (McGraw-Hill, New York 1986, Chapter 12).

FIG. 8 is a block diagram illustrating in greater detail an example of the structure of an interference cancellation block in a receiver according to a preferred embodiment of the invention. The output signals 64a to 64c of the matched filter groups, the number of which is $\tilde{K}$, are supplied as input to the interference cancellation unit 70 which may comprise one or several stages 72, 72. The output signal 64a to 64c of the filter groups is also supplied as input to a channel estimation block 73 wherein estimates $\hat{\alpha}, \hat{\tau}, \hat{R}$ are calculated for the signals and channel parameters transmitted at different data rates. Data 75 about the calculated estimates is supplied to the interference cancellation block 70, and when a multiphase interference cancellation algorithm is concerned, the data is supplied to a first interference cancellation block 71 wherein the preliminary estimates $\hat{b}_1, \ldots, \hat{b}_{\tilde{K}}$ 78a to 78c are calculated for each user for the received symbols. In case of a multistage interference cancellation algorithm, the calculated preliminary estimates are supplied to a second stage 72 wherein new estimates are calculated for the received signals, the estimates 79a to 79c being further supplied to the post-processing unit. The same estimates 76 are also supplied to the channel estimation block 73 wherein better estimates are calculated, on the basis of the more recent estimates, for the channel parameters, which are applied 77 back to the interference cancellation block 72 to be utilized in the detection.

The control means 55 of the receiver naturally receive information 77 concerning the data rate of each connection, and this data can be transmitted between the transmitter and the receiver during the call set-up or it can be detected from the received signal. If the data rate used over the connection changes, information 74 concerning the change must also be forwarded to the channel estimation block 73 wherein the matrix $\hat{R}$ must be updated.

The type of the interference cancellation algorithm applied in the method and receiver according to the invention is not essential as such. Possible interference cancellation methods are for example decorrelation, Viterbi and multistage interference cancellation methods and other methods known to a person skilled in the art.

Even though the invention is described above with reference to the examples according to the accompanying drawings, it is clear that the invention is not restricted thereto, but it can be modified in many ways within the scope of the inventive idea disclosed in the appended claims.

What is claimed is:

1. Data transmission method in a system which utilizes a CDMA method, in which several users communicate simultaneously on the Same frequency band, and in which each user has at least one corresponding broad-band information channel, and in which the information channel capacity of at least one user differs from the capacity of the other users, wherein the parameters of each information channel depend on the desired capacity and transmission quality, and that each information channel is detected by taking into account correlations between different channels corresponding to different users, wherein an effect of correlation arising from different spreading codes of the different channels is removed, and wherein: different users have data symbols of different length; the data symbol lengths of different users are selected in such a way that the symbol lengths used are fractions of the length of a specific given super symbol, the spreading code sequences that modulate the data symbols of the users recur at intervals of the given super symbol, during detection the interference between the users is decreased by taking into account the mutual correlations between the received signals, detection is implemented in such a way that a desired number of signals are received and correlation terms over the super symbol to be detected are calculated, and these correlation terms are utilized in the detection in such a way that the mutual interference between the signals to be transmitted with different data symbol rates is eliminated.

2. A method according to claim 1, characterized in that the transmission capacity of each information channel can be selected from a group of connection types with different capacities.

3. A method according to claim 1, characterized in that the information channel is realized by means of a long spreading code.

4. A method according to claim 1, characterized in that the parameters of the information channel comprise the users's spreading code bit rate, data symbol rate, quality requirement of the signal, and number of spreading codes used per data symbol.

5. A method according to claim 4, characterized in that at least some of the spreading codes used are substantially mutually nonorthogonal.

6. A method according to claim 1, characterized in that each user's spreading code bit rate, data symbol rate and number of spreading codes used per data symbol depend on the transmission rate set for the connection.

7. A method according to claim 1, characterized in that users with a different capacity have a different length of data symbol.

8. A method according to claim 7, characterized in that the data symbol lengths used in the systems are fractions of the length of the super symbol given.

9. A method according to claim 8, characterized in that the spreading code sequence used over the connection has the length of the super symbol given.

10. A method according to claim 9, characterized in that each symbol to be transmitted is multiplied by a spreading code sequence, and some of the sequences are substantially mutually nonorthogonal.

11. A method according to claim 8, characterized in that the interference cancellation algorithms process the received signal in parts having the length of the super symbol given.

12. A method according to claim 1, characterized in that spreading codes of different lengths are used over different connections.

13. A method according to claim 1, characterized in that each information channel is detected by means of a correlation matrix.

14. A method according to claim 1, further comprising changing the allotted channel in accordance with changes in the data rate.

15. A transmitter in a system which utilizes the CDMA method and in which several users communicate simultaneously on the same frequency channel, the transmitter comprising means for forming the symbols to be transmitted, wherein the transmitter comprises means regulating the length of the symbols to be transmitted, means for converting a desired number of symbols to be transmitted into a parallel form, means for generating spreading code sequences the number of which equals the number of the symbols to be transmitted in parallel, and means for multiplying each of the symbols to be transmitted by its own sequence, and wherein: different users have data symbols of different length, the data symbol lengths of different users are selected in such a way that the symbol lengths used are fractions of the length of a specific given super symbol, the spreading code sequences that modulate the data symbols of the users recur at intervals of the given super symbol, during detection the interference between the users is decreased by taking into account the mutual correlations between the received signals, detection is implemented in such a way that a desired number of signals are received and correlation terms over the super symbol to be detected are calculated, and these correlation terms are utilized in the detection in such a way that the mutual interference between the signals to be transmitted with different data symbol rates is eliminated.

16. A transmitter according to claim 15, characterized in that the transmitter comprises means (42a–42c) for generating spreading codes some of which are substantially mutually nonorthogonal.

17. A transmitter according to claim 15, characterized in that the transmitter comprises means (42a–42c) for generating spreading code sequences which are formed of successive parts of one long code.

18. A transmitter according to claim 15, further comprising changing the allotted channel in accordance with changes in the data rate.

19. A receiver in a system which utilizes a CDMA method, in which several users communicate simultaneously on the same frequency band, and in which each user has its own different spreading code, and in which the information channel capacity of at least one user differs from the capacity of the other users, the receiver comprising converter means for converting a received transmission into a digital form, and a number of means for synchronizing and for calculating a characteristic required for a decision from the transmission of each received user, wherein said number of means each comprise a group of correlators which may be synchronized with waveforms of different types, and that the receiver comprises means for processing said characteristics calculated for the different types of waveforms by eliminating the effect of correlations arising from the different spreading code of each different channel corresponding to each user, and wherein: different users have data symbols of different length, the data symbol lengths of different users are selected in such a way that the symbol lengths used are fractions of the length of a specific given super symbol, the spreading code sequences that modulate the data symbols of the users recur at intervals of the given super symbol, during detection the interference between users is decreased by taking into account the mutual correlations between the received signals, detection is implemented in such a way that a desired number of signals are received and correlation terms over the super symbol to be detected are calculated, and these correlation terms are utilized in the detection in such a way that the mutual interference between the signals to be transmitted with different data symbol rates is eliminated.

20. A receiver according to claim 19, characterized in that the correlators (80–83) are synchronized and they calculate characteristics for waveforms that differ in length in time, and that the characteristics processed by the means (62) are calculated from waveforms of different lengths.

21. A receiver according to claim 19, characterized in that the correlators (80–83) are synchronized and they calculate characteristics for waveforms which are parallel, and that the characteristics processed by the means (62) are calculated from parallel waveforms.

22. A receiver according to claim 21, characterized in that the receiver comprises means (63a–63c) for combining the parallel waveforms of each user.

23. A receiver according to claim 22, characterized in that the receiver comprises control means (55) controlling the operation of the correlators (80–83) and the processing means (62).

24. A receiver according to claim 19, characterized in that the receiver comprises signal-division means (60) which divide a digitized signal to the different characteristic-calculating means (61a–61c) of the receiver.

25. The receiver of claim 19, further comprising changing the allotted channel in accordance with the changes in the data rate.

\* \* \* \* \*